(12) United States Patent
Falster et al.

(10) Patent No.: US 10,780,798 B2
(45) Date of Patent: Sep. 22, 2020

(54) SEAT COMPONENT ADJUSTMENT ACTUATOR, VEHICLE SEAT, AND METHOD OF ADJUSTING A SEAT COMPONENT

(71) Applicant: Schukra Gerätebau GmbH, Berndorf (AT)

(72) Inventors: Frank Falster, Nuremberg (DE); Klaus Junker, Diessen am Ammersee (DE); Gunter Maierhofer, Veitsbronn (DE)

(73) Assignee: Schukra Gerätebau GmbH, Berndorf (AU)

( * ) Notice: Subject to any disclaimer, the term of this patent is extended or adjusted under 35 U.S.C. 154(b) by 171 days.

(21) Appl. No.: 15/753,933

(22) PCT Filed: Aug. 21, 2015

(86) PCT No.: PCT/EP2015/069226
§ 371 (c)(1),
(2) Date: Feb. 20, 2018

(87) PCT Pub. No.: WO2017/032390
PCT Pub. Date: Mar. 2, 2017

(65) Prior Publication Data
US 2018/0251043 A1 Sep. 6, 2018

(51) Int. Cl.
*F16H 1/16* (2006.01)
*F16H 1/20* (2006.01)
(Continued)

(52) U.S. Cl.
CPC ......... *B60N 2/0232* (2013.01); *B60N 2/0284* (2013.01); *B60N 2/821* (2018.02);
(Continued)

(58) Field of Classification Search
CPC .... B60N 2/0232; B60N 2/0284; B60N 2/821; B60N 2/829; B60N 2/85; B60N 2/853;
(Continued)

(56) References Cited

U.S. PATENT DOCUMENTS

| 2,863,325 A | 12/1958 | Eisenberg et al. |
| 4,158,483 A * | 6/1979 | Fisher ............. B60R 1/072 359/876 |

(Continued)

FOREIGN PATENT DOCUMENTS

| CN | 2909211 Y | 6/2007 |
| CN | 103661047 A | 3/2014 |

(Continued)

OTHER PUBLICATIONS

Machine translation of JP 2000-264130 A dated Oct. 4, 2019.*

(Continued)

*Primary Examiner* — Adam D Rogers
(74) *Attorney, Agent, or Firm* — Michael Best & Friedrich LLP

(57) ABSTRACT

A seat component adjustment actuator (1) comprises a housing, an electric motor (5), and a gearing (10) coupled to the electric motor (5) and comprising at least three worm transmission stages (11-16). A first worm transmission stage (11, 12) comprises a first worm (11) and a first worm gear (12) engaged with the first worm (11). A third worm transmission stage (15, 16) comprises a third worm (15) and a third worm gear (16) engaged with the third worm (15). The first worm (11) is supported in the housing such that the first worm (11) is rotatable about an input rotation axis. The third worm gear (16) is supported in the housing such that the third worm gear (16) is rotatable about an output rotation axis which is transverse to the input rotation axis.

12 Claims, 11 Drawing Sheets

(51) Int. Cl.
B60N 2/02 (2006.01)
F16H 57/021 (2012.01)
B60N 2/821 (2018.01)
B60N 2/829 (2018.01)
B60N 2/90 (2018.01)
B60N 2/85 (2018.01)
B60N 2/853 (2018.01)
F16H 57/039 (2012.01)

(52) U.S. Cl.
CPC .............. *B60N 2/829* (2018.02); *B60N 2/85* (2018.02); *B60N 2/853* (2018.02); *B60N 2/919* (2018.02); *F16H 1/16* (2013.01); *F16H 1/203* (2013.01); *F16H 57/021* (2013.01); *F16H 57/039* (2013.01); *B60N 2002/024* (2013.01); *B60N 2002/0236* (2013.01); *F16H 2057/0213* (2013.01)

(58) Field of Classification Search
CPC ............ B60N 2/919; B60N 2002/0236; B60N 2002/024; F16H 1/16; F16H 1/20; F16H 1/203; F16H 1/206; F16H 1/225; F16H 2057/0213; F16H 57/021; F16H 57/039
See application file for complete search history.

(56) References Cited

U.S. PATENT DOCUMENTS

| | | | | |
|---|---|---|---|---|
| 9,061,616 | B2 * | 6/2015 | Kondrad | ................. B60N 2/22 |
| 9,365,140 | B2 * | 6/2016 | Falster | ................. B60N 2/821 |
| 9,989,133 | B2 * | 6/2018 | Wu | ................. F16H 1/203 |
| 10,240,663 | B2 * | 3/2019 | Nickel | ................. E05F 15/611 |
| 2008/0007105 | A1 * | 1/2008 | Viger | ................. A47C 7/38 |
| | | | | 297/408 |
| 2014/0070583 | A1 | 3/2014 | McMillen et al. | |
| 2015/0183347 | A1 | 7/2015 | Falster et al. | |
| 2017/0044805 | A1 * | 2/2017 | Deppe | ................. E05B 81/28 |

FOREIGN PATENT DOCUMENTS

| | | |
|---|---|---|
| CN | 104379400 A | 2/2015 |
| EP | 2 698 277 A1 | 2/2014 |
| GB | 184 232 A | 7/1922 |
| JP | S60147723 U | 10/1985 |
| JP | H10 129349 A | 5/1998 |
| JP | 2000264130 A | 9/2000 |
| JP | 2010216584 A | 9/2010 |
| JP | 2017501933 A | 1/2017 |
| JP | 2017502771 A | 1/2017 |
| WO | 2015/113633 A1 | 8/2015 |

OTHER PUBLICATIONS

PCT/EP2015/069226 International Search Report and Written Opinion from the International Searching Authority dated Apr. 22, 2016 (14 pages).

* cited by examiner

SEAT COMPONENT ADJUSTMENT ACTUATOR, VEHICLE SEAT, AND METHOD OF ADJUSTING A SEAT COMPONENT

TECHNICAL FIELD

Embodiments of the invention relate to an actuator for seat component adjustment and to a method of adjusting a seat component. Embodiments of the invention relate in particular to an actuator which is configured for installation in a seat components of a vehicle seat.

BACKGROUND

A wide variety of seats is provided with adjustable components. Adjustable headrests or mechanisms for seat cushion length adjustment or adjustable footrests are examples for such adjustable components. Such seat components may be adjustable to attain enhanced comfort or for security reasons. For illustration, for headrest adjustment, an adjusting mechanism may be provided which displaces a front surface of the headrest towards or away from the seat occupant and/or which adjusts a height at which the headrest is positioned. For seat cushion length adjustment, an adjusting mechanism may be provided which allows the length of the seat cushion in the forward-rearward direction to be adjusted. For footrest adjustment, an adjusting mechanism may be provided which allows the footrest to be expanded from below a front seat or retracted to the stowage space below the front seat. Simple mechanical mechanisms which require the user to manually adjust the adjustable seat component to a desired location may be used in some applications. However, in many cases, it is desirable that the headrest can be displaced in an automated manner.

Automated seat component adjusting mechanisms may be based on a pneumatic adjustment. However, a significant amount of tubing may be required for inflating and deflating inflatable bladders. To avoid such shortcomings, automated seat component adjusting mechanisms may include a motor and a mechanical transmission. Conventional adjusting mechanisms may suffer from large construction which may require a significant volume of installation space to be reserved for the adjusting mechanism, e.g. in a backrest of a vehicle seat. This may be undesirable. For illustration, with an increasing number of functions which is integrated into modern vehicle seats, installation space may become an issue. Installation of such large actuating mechanisms may be possible only during the final assembly of the vehicle seat, which may add to the costs compared to modular techniques in which the actuator may be integrated with the seat component which is to be adjusted.

BRIEF SUMMARY OF THE INVENTION

There is a need in the art for an improved adjusting mechanism for a seat component. In particular, there is a need in the art for a seat component adjustment actuator and method which provide advantages in terms of installation space requirements. There is also a need for a seat component adjustment actuator and method that allow an adjustable seat component to be easily attached to a seat, for example to a vehicle seat.

According to embodiments of the invention, a seat component adjustment actuator is provided which comprises an electric motor and a gearing coupled between the electric motor and an output of the actuator. The gearing comprises at least three worm transmission stages. Such a configuration allows a compact electric motor to be used, while the three worm transmission stages can be arranged in a particularly compact manner, thereby reducing installation space requirements.

A seat component adjustment actuator according to an embodiment comprises an electric motor and a gearing coupled to the electric motor. The seat component adjustment actuator comprises a housing which houses the gearing. The gearing comprises at least three worm transmission stages. A first worm transmission stage of the at least three worm transmission stages comprises a first worm and a first worm gear engaged with the first worm. A third worm transmission stage of the at least three worm transmission stages comprises a third worm and a third worm gear engaged with the third worm. The first worm is supported in the housing such that the first worm is rotatable about an input rotation axis and wherein the third worm gear is supported in the housing such that the third worm gear is rotatable about an output rotation axis which is transverse to the input rotation axis.

Such a seat component adjustment actuator has an output which is oriented transverse to a rotation axis of the first worm, which may be defined by the output shaft of the electric motor. Such a configuration with three worm transmission stages and an output oriented transversely to the rotation axis of the first worm provides a compact actuator design, because the input rotation axis may extend in parallel to the third worm gear.

The first worm gear may be rotatable about a first rotation axis which is parallel to the output rotation axis. This allows the gearing componentry to be substantially delimited, on opposing lateral sides, by the first worm and the third worm, with the first worm and the third worm extending along parallel rotation axes.

The third worm gear and a first worm gear which is engaged with the first worm may extend such that axial end faces of the first worm gear and of the third worm gear extend parallel to each other.

The third worm gear may be offset relative to the first worm gear. The third worm gear may be offset in a direction parallel to the output rotation axis from the first worm gear. Thereby, compact overlapping arrangements of the first and third worm gears may be arranged.

The housing may comprise a step to support the third worm gear such that it is offset in a direction parallel to the output rotation axis from the first worm gear. The offset may thereby be implemented in a simple manner.

The third worm gear may at least partially overlap the first worm gear. This reduces the lateral dimensions of the seat component adjustment actuator.

A second worm transmission stage of the at least three worm transmission stages may comprise a second worm connected to the first worm gear in a torque-proof manner and a second worm gear engaged with the second worm, the second worm gear being rotatable about a second rotation axis which is parallel to the input rotation axis. The parallel orientation of the second rotation axis and the input rotation axis allows the gearing to be constructed with a smaller width than if the second rotation axis were transverse to the input rotation axis.

The output rotation axis may extend in between a first plane which includes the input rotation axis and extends parallel to the output rotation axis, and a second plane which includes the second rotation axis and extends parallel to the output rotation axis. The space which must be provided in between the first worm and the third worm may thereby be used for at least partially accommodating the third worm gear therein.

The first rotation axis about which the first worm gear and the second worm are rotatable may extend in between the first plane and the second plane.

A shaft attached to the third worm gear may project from the housing. The third worm gear may have a non-circular inner surface for receiving the shaft therein. The non-circular inner surface may be polygon-shaped.

The shaft may have a thread formed at an outer surface thereof. The threaded shaft may be formed by overmolding the third worm gear. A spindle nut may be engaged with the thread of the shaft to implement a spindle drive. The spindle nut may be secured against rotation.

The shaft may have a toothed section on its outer circumference. A pinion may be overmolded or otherwise be attached to the shaft. A plurality of pinions may be provided on the same shaft. The pinion(s) may be engaged with at least one rack.

The housing may comprise an exterior abutment surface on which an end face of a motor housing of the electric motor abuts. Flexibility in mounting the motor is enhanced, and actuator size may be reduced because the electric motor does not need to be fully received in the housing which supports the gearing.

The seat component adjustment actuator may further comprise a bracket to retain the end face in abutment with the abutment surface of the housing. The bracket may comprise a metal bracket. The bracket may comprise a plastic bracket. The bracket may be configured to engage the housing via a hook connection or via a snap connection, for example.

The housing may comprise an attachment feature configured for detachable attachment of the bracket. The attachment feature may be configured for attachment of a hook or may comprise a snap connection. Adaptation of the seat component adjustment actuator for different mounting conditions in various seat components may thereby be facilitated.

A seat component according to an embodiment comprises a shell configured for displaceable attachment to a seat and the seat component adjustment actuator according to any embodiment. The seat component adjustment actuator may be mounted in a cavity defined within the shell.

The seat component may be a headrest.

The seat component may be a sub-structure for a vehicle seat. The seat component may be a seat pan or a footrest.

A seat according to an embodiment comprises a seat component comprising a shell which is displaceably mounted and which defines a cavity therein. The seat comprises the seat component adjustment actuator according to an embodiment which is mounted in the cavity and configured to effect a displacement of the shell relative to the seat.

The seat may comprise a further seat component adjustment actuator according to an embodiment. The seat component adjustment actuator and the further seat component adjustment actuator are configured to displace the seat component in at least two directions which are transverse to each other.

The seat component adjustment actuator and the further seat component adjustment actuator may both be housed within the cavity of the seat component.

The seat component may be a headrest.

The seat component may be a sub-structure for a vehicle seat. The seat component may be a seat pan or a footrest.

The seat may be a vehicle seat. The seat may be an automotive vehicle seat. The seat may be a car seat.

The seat component adjustment actuator may be configured to adjust the headrest in a height direction, and the further seat component adjustment actuator may be configured to adjust the headrest in a forward-rearward direction. The further seat component adjustment actuator may be configured to pivot the headrest about a pivot axis which is perpendicular to the height direction.

According to another embodiment, there is provided a method of using a seat component adjustment actuator according to an embodiment for adjusting a seat component.

The seat component adjustment actuator may be provided in a cavity of the seat component which is adjusted.

The devices and methods according to various embodiments may be utilized for adjusting a headrest or another seat component. The devices and methods according to the various embodiments may be used for adjusting a headrest or another seat component of a vehicle seat, in particular of an automotive vehicle seat.

The devices and methods according to embodiments provide an actuator with compact size, which is suitable for installation within a seat component such as a headrest or a seat cushion substructure. Installation space requirements are thereby mitigated.

BRIEF DESCRIPTION OF THE SEVERAL
VIEWS OF THE DRAWINGS

Additional features and advantages of the invention will become more readily appreciated from the following detailed description of preferred or advantageous embodiments with reference to the accompanying drawings in which like reference numerals designate like elements.

DESCRIPTION OF EMBODIMENTS

Figure 1:
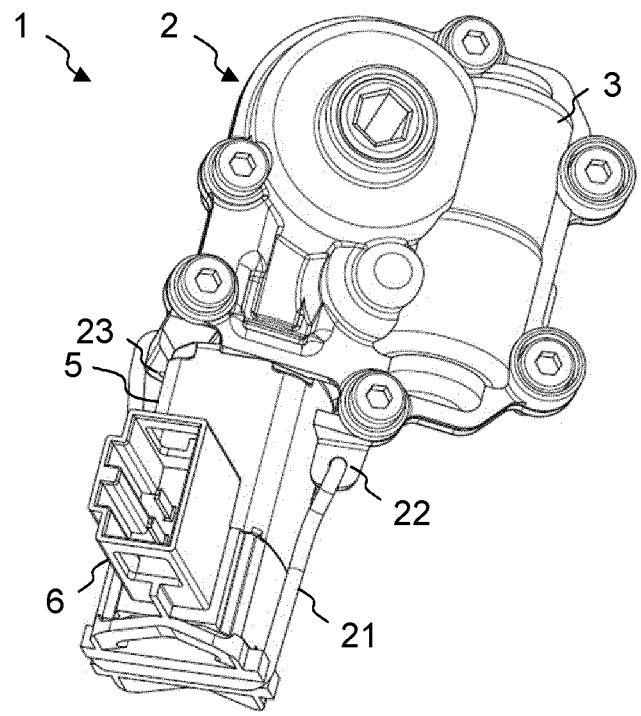
FIG. 1 shows a perspective view of a seat component adjustment actuator according to an embodiment.

Exemplary embodiments of the invention will now be described with reference to the drawings. In the drawings, like or identical reference numerals refer to like or identical components.

While some embodiments will be described in the context of specific fields of application, such as in the context of automotive vehicle seating, the embodiments are not limited to this field of application. The features of the various embodiments may be combined with each other unless specifically noted otherwise. In the drawings, like reference numerals refer to like elements.

Figure 2:
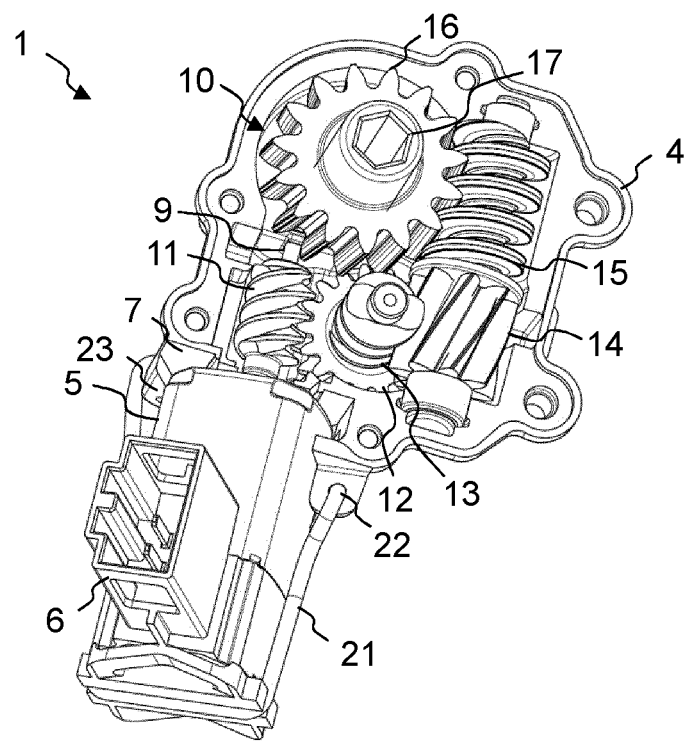
FIG. 2 shows a partially broken-away perspective view of the seat component adjustment actuator of FIG. 1.
Figure 3:
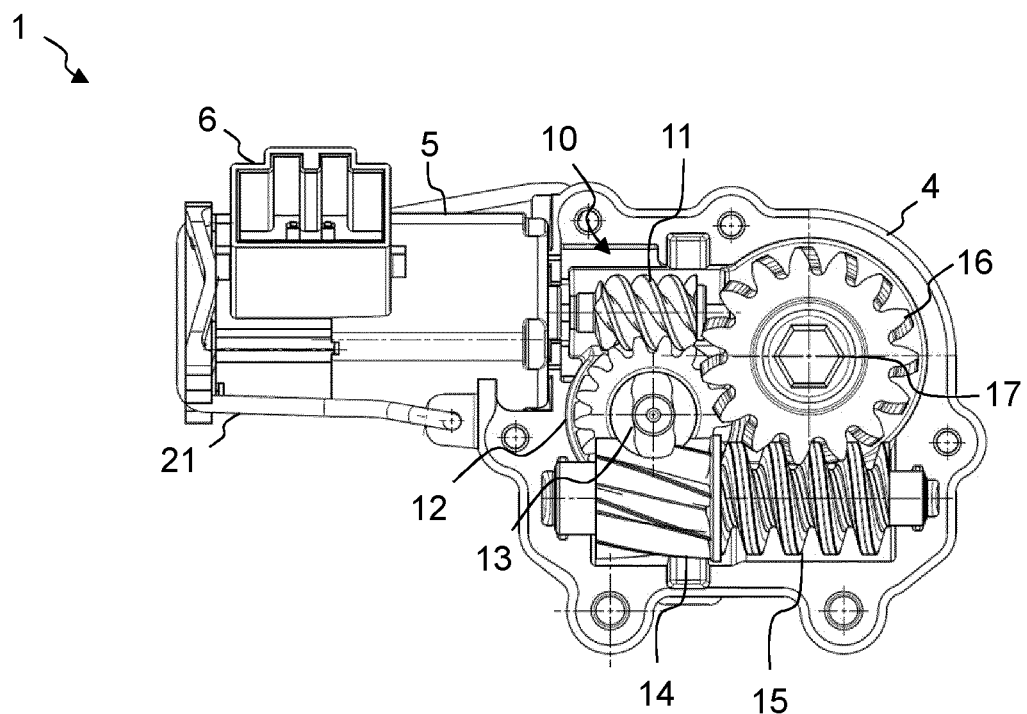
FIG. 3 shows a partially broken-away plan view of the seat component adjustment actuator of FIG. 1.
Figure 4:
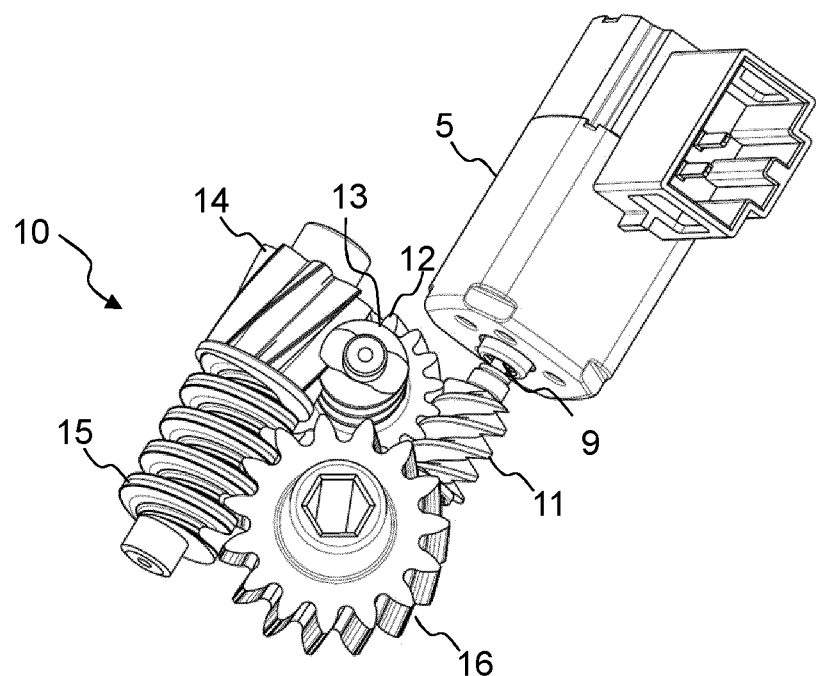
FIG. 4 shows a partial perspective view of the seat component adjustment actuator of FIG. 1.
Figure 5:
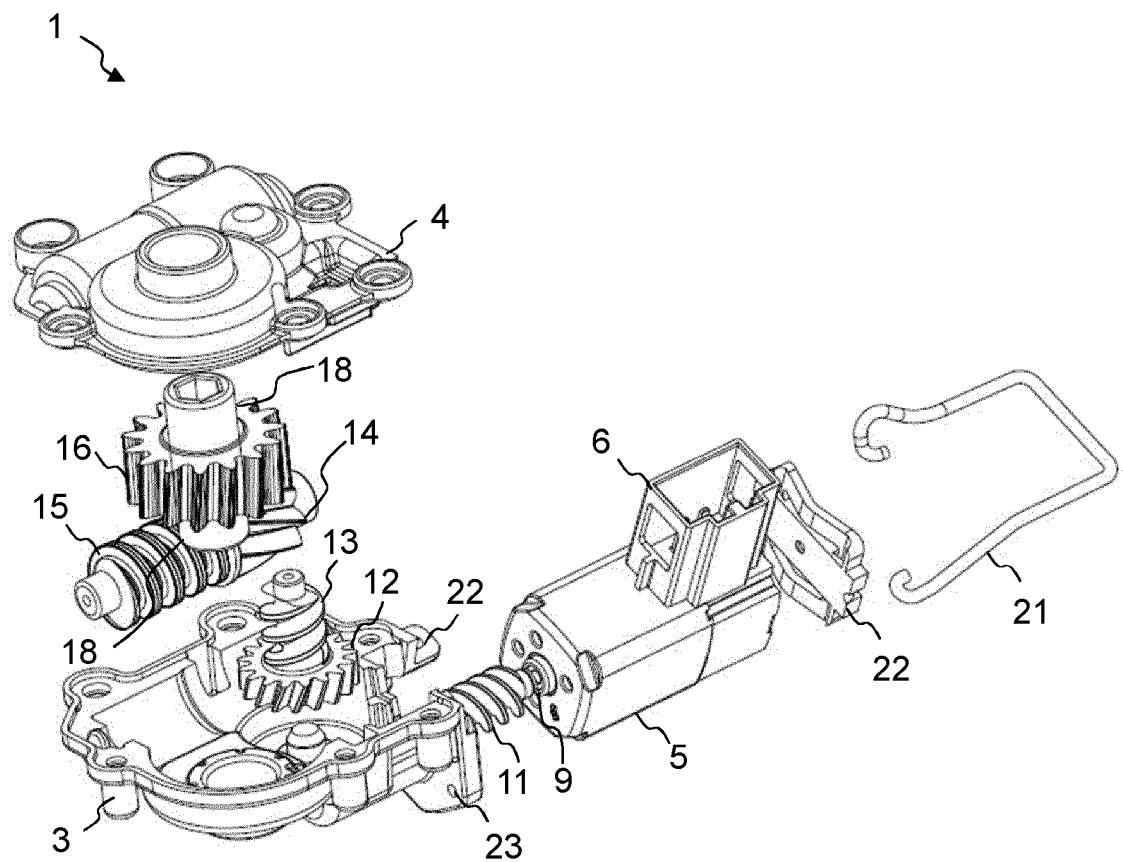
FIG. 5 shows an exploded perspective view of a seat component adjustment actuator of FIG. 1.

FIG. 1 shows a perspective view of a seat component adjustment actuator 1 according to an embodiment. FIG. 2 shows a perspective view of the seat component adjustment actuator 1 of FIG. 1 with a first housing shell 3 removed. FIG. 3 shows a plan view of the seat component adjustment actuator 1 of FIG. 1 with the first housing shell 3 removed. FIG. 4 shows an enlarged partial view of the electric motor and gearing of the seat component adjustment actuator 1 of FIG. 1. FIG. 5 shows an exploded view of the seat component adjustment actuator 1 of FIG. 1.

The seat component adjustment actuator 1 may be configured for installation in an adjustable seat component, e.g. in a headrest of a vehicle seat and/or in a seat pan underlying a seat cushion of a vehicle seat.

The seat component adjustment actuator 1 generally comprises an electric motor 5. An output shaft 9 of the electric motor 9 is coupled with an input of a gearing 10. The gearing 10 may be formed as a three-stage worm transmission gearing. The gearing 10 comprises a first worm transmission stage, a second worm transmission stage and a third worm transmission stage.

The first worm transmission stage comprises a first worm 11 and a first worm gear 12 which is engaged with the first worm 11. The first worm 11 may be attached to the output shaft 9 of the electric motor 5 in a torque-proof manner. The first worm 11 may be molded onto the output shaft 9.

The second worm transmission stage comprises a second worm 13 and a second worm gear 14 engaged with the second worm 13. The second worm 13 is coupled to the first worm gear 12 in a torque-proof manner. The second worm 13 and the first worm gear 12 may be integrally formed, e.g. as a unitary component. The second worm 13 and the first worm gear 12 may be an integral unit formed by molding.

The third worm transmission stage comprises a third worm 15 and a third worm gear 16 engaged with the third worm 15. The third worm 15 is coupled to the second worm gear 14 in a torque-proof manner. The third worm 15 and the second worm gear 14 may be integrally formed, e.g. as a unitary component. The third worm 15 and the second worm gear 14 may be an integral unit formed by molding.

The third worm gear 16 may act as output of the electric actuator 10. The third worm gear 16 may be attached to a shaft. At least a portion of the shaft may be provided with an external toothing or external thread. For illustration, pinions may be overmolded onto the shaft or otherwise attached to the shaft to displace the seat component via a rack and pinion drive. An external thread may be formed on the shaft to displace the seat component via a spindle drive. Other configurations may be used, depending on the respective implementation of a rotary-to-linear motion conversion mechanism which is employed for adjustment of the seat component.

The third worm gear 16 may comprise a recess 17 for receiving the shaft therein. The shaft, which may be the output of the seat component adjustment actuator 1, may be insertable into the recess 17. The recess 17 may be configured to retain the shaft in a torque-proof manner. The recess 17 may have a non-circular cross section. An inner wall of the third worm gear 16 may have a polygon-shaped cross section to retain the shaft in a form fit.

The three-stage worm transmission may be supported in the housing 2. The housing 2 may comprise a first housing shell 3 and a second housing shell 4. The first housing shell 3 and the second housing shell 4 may be attached to each other by screws, bolts, rivets, ultrasonic welding, laser welding or other techniques. The first housing shell 3 and the second housing shell 4 may be formed of a plastic material, e.g. by molding.

The electric motor 5 may be arranged such that, while the output shaft 9 of the electric motor 5 projects into an interior of the housing 2, a motor housing of the electric motor 5 may project externally from the housing 2. Installation space may thereby be reduced further, because the housing does not need to cover all of the electric motor 5.

The seat component adjustment actuator 1 may comprise a bracket 21 which retains the electric motor 5 on the housing 2. The bracket 21 may engage an axial end face of the electric motor which is opposite to another axial end face from which the output shaft 9 projects. The bracket 21 may at least partially surround the electric motor 5. The bracket 21 may force the electric motor 5 into abutment with an external abutment surface 7 which is provided on the housing 2.

The housing 2 may comprise attachment features 22, 23 for attaching the bracket 21 to the housing 2. The attachment features 22, 23 may comprise any one, or any combination of, opening for receiving hooks or snap coupling members for engaging the bracket 21 in a snap connection.

The bracket 21 may comprise a metal wire which is formed so as to extend along lateral sides and one axial end face of the electric motor 5. Ends of the bracket 21 may formed so as to have a hook shape. The hook-shaped ends of the bracket 21 may be configured for engagement with the attachment features 22, 23 to retain the electric motor in abutment on the housing 2.

The electric motor 5 may comprise a connector 6 for connection to an electric board network of e vehicle. The connector 6 may be detachably coupled to the motor housing of the electric motor 5, so that it can be removed from the motor housing without destroying the connector 6 and the electric motor 5. Such a configuration allows the seat component adjustment actuator 6 to be readily adaptable for use with different vehicle board networks.

As will be explained in more detail in the following, the three-stage worm transmission 10 has an arrangement of worms and worm gears which provide a particularly compact design. This is beneficial in terms of installation space, allowing the seat component adjustment actuator 2 to be installed in an interior of the seat component which is to be adjusted, for example.

The first worm 11 is supported on the housing 2 so as to be rotatable about an input rotation axis. The input rotation axis may be defined by the output shaft 9 of the electric motor 5.

The first worm gear 12 and the second worm 13 are supported on the housing 2 so as to be rotatable about a first rotation axis. The first rotation axis is perpendicular to the input rotation axis.

The second worm gear 14 and the third worm 15 are supported on the housing 2 so as to be rotatable about a second rotation axis. The second rotation axis is parallel to the input rotation axis. The second rotation axis is perpendicular to the first rotation axis.

The third worm gear 13 is supported on the housing 2 so as to be rotatable about an output rotation axis. The output rotation axis is perpendicular to the input rotation axis, allowing the electric motor 5 to extend transversely relative to the shaft which is driven by the seat component adjustment actuator 1. The output rotation axis is parallel to the first rotation axis about which the first worm gear 12 and the second worm 13 are rotatable. Such a configuration allows the three worm transmission stages to be arranged in a very compact manner.

The seat component adjustment actuator 1 is configured in such a way that the input rotation axis about which the first worm 11 of the first worm transmission stage is rotatable and the second rotation axis about which the second worm gear 14 and the third worm 15 are rotatable extend parallel to each other.

The seat component adjustment actuator 1 is configured in such a way that the first rotation axis about which the first worm gear 12 and the second worm 13 are rotatable and the output rotation axis about which the third worm gear 16 is rotatable extend parallel to each other.

The seat component adjustment actuator 1 is configured in such a way that the output rotation axis about which the third worm gear 16 is rotatable extends along a direction which is perpendicular relative to the input rotation axis.

The seat component adjustment actuator 1 is configured in such a way that both the first rotation axis about which the first worm gear 12 and the second worm 13 are rotatable and the output rotation axis about which the third worm gear 16 is rotatable are arranged on the same side relative to the input rotation axis about which the first worm 11 is rotatable. The seat component adjustment actuator 1 is configured in such a way that both the first rotation axis about which the first worm gear 12 and the second worm 13 are rotatable and the output rotation axis about which the third worm gear 16 is rotatable are arranged on the same side relative to the second rotation axis about which the second worm gear 14 and the third worm 15 are rotatable.

The arrangement of rotation axes of the various worms and worm gears of the three-stage worm transmission provide the seat component adjustment actuator with a compact design.

Figure 6:
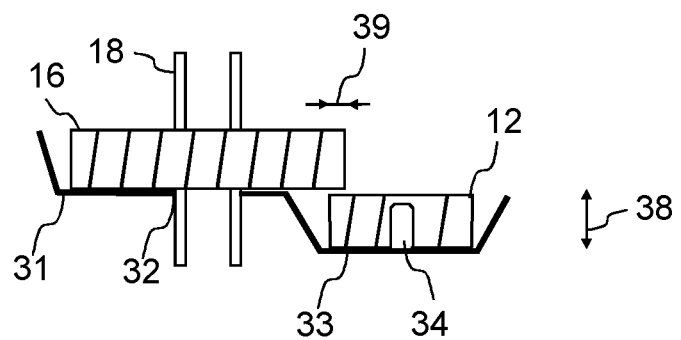
FIG. 6 is a partially broken-away cross-sectional view of a seat component adjustment actuator according to an embodiment.

FIG. 6 is a partially broken away cross-sectional view of a seat component adjustment actuator 1 according to an embodiment. The configuration explained with reference to FIG. 6 may be used in the seat component adjustment actuator according to any embodiment disclosed herein.

The third worm gear 16 of the third worm transmission stage and the first worm gear 12 of the first worm transmission stage are arranged to rotate about parallel rotation axes. The housing 2 may comprise an opening 32 through which a sleeve 18 which is attached to or integral with the third worm gear 16 extends to define the output rotation axis. The housing 2 may define a first rotation axis 34 for the first worm gear 12 which is parallel to the output rotation axis about which the third worm gear 16 is rotatable.

The housing may support the first worm gear 12 and the third worm gear 16 in such a manner that the third worm gear 16 and the first worm gear 12 may be at least partially overlapping. The housing may define a step between a first housing section 31 on which the third worm gear 16 rotates and a second housing section 33 on which the first worm gear 12 rotates. A height of the step may define an offset 38 in a direction parallel to the output rotation axis. The offset 38 may exceed a height of the first worm gear 12 to ensure that axial end faces of the first worm gear 12 and of the third worm gear 16 remain spaced from each other.

A distance between the output rotation axis and the first rotation axis may be less than the sum of the radius of the third worm gear 16 and the radius of the first worm gear 12. The first worm gear 12 and the third worm gear 16 are thereby arranged in an overlapping relationship. An overlap 39 may be smaller than the smaller one of the radius of the third worm gear 16 and the radius of the first worm gear 12.

Arranging the first worm gear 12 and the third worm gear 16, which both extend in planes parallel to the input rotation axis about which the first worm 11 rotates, in an overlapping relationship as explained with reference to FIG. 6 further reduces the lateral dimensions of the seat component adjustment actuator.

Figure 7:
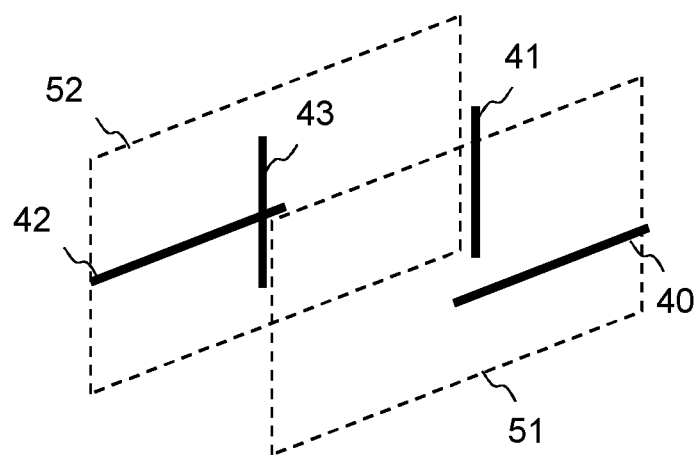
FIG. 7 is a perspective view which illustrates an arrangement of rotation axes of a seat component adjustment actuator according to an embodiment.
Figure 8:
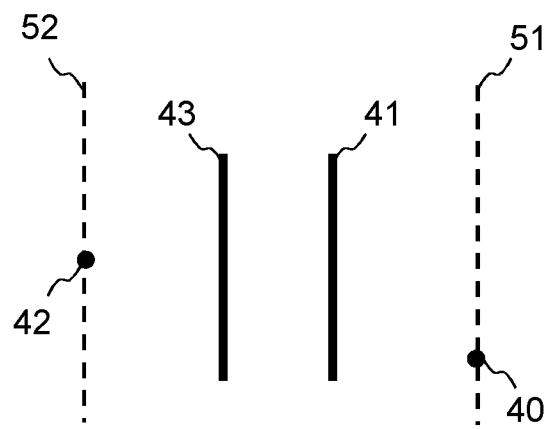
FIG. 8 is a plan view which illustrates an arrangement of rotation axes of a seat component adjustment actuator according to an embodiment.

FIG. 7 and FIG. 8 further illustration features of an arrangement of rotation axes which may be implemented in the seat component adjustment actuator according to any one embodiment. Only rotation axes and planes defined thereby are shown in FIG. 7 and FIG. 8 for enhanced clarity. FIG. 7 shows a perspective view and FIG. 8 shows a plan view with viewing direction parallel to the input rotation axis of the arrangement of rotation axes.

The first worm 11 is rotatable about the input rotation axis 40. The first worm gear 12 and the second worm 13 are rotatable about the first rotation axis 41. The second worm gear 14 and the third worm 15 are rotatable about the second rotation axis 42. The third worm gear 16 is rotatable about the output rotation axis 43.

As explained with reference to FIG. 1 to FIG. 6, the input rotation axis 40 and the second rotation axis 42 may be parallel to each other. The first rotation axis 41 and the output rotation axis 43 may be parallel to each other. The first rotation axis 41 may extend along a direction which extends perpendicularly to both the input rotation axis 40 and the second rotation axis 42. The output rotation axis 43 may extend along a direction which extends perpendicularly to both the input rotation axis 40 and the second rotation axis 42.

A first plane 51 is defined such that it includes the input rotation axis 40 and extends parallel to the output rotation axis 43. It will be appreciated that the arrangement of the first plane 51 is uniquely determined by the arrangement of rotation axes defined by the housing 2.

A second plane 52 is defined such that it includes the second rotation axis 42 and extends parallel to the output rotation axis 43. It will be appreciated that the arrangement of the second plane 52 is uniquely determined by the arrangement of rotation axes defined by the housing 2.

Both the first rotation axis 41 and the output rotation axis 43 may be arranged in the space in between the first plane 51 and the second plane 52. Thereby, the space available in between the first worm 11 and the third worm 15, in which the first worm gear 12 and the second worm 13 are accommodated, may additionally also be used for accommodating the third worm wheel 16 therein.

Figure 9:
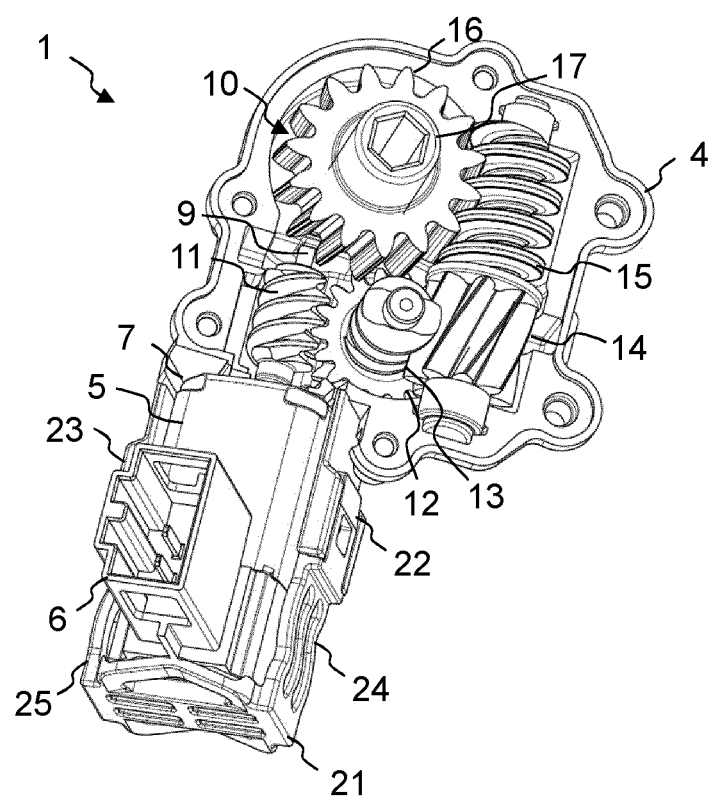
FIG. 9 shows a partially broken-away perspective view of a seat component adjustment actuator according to an embodiment.
Figure 10:
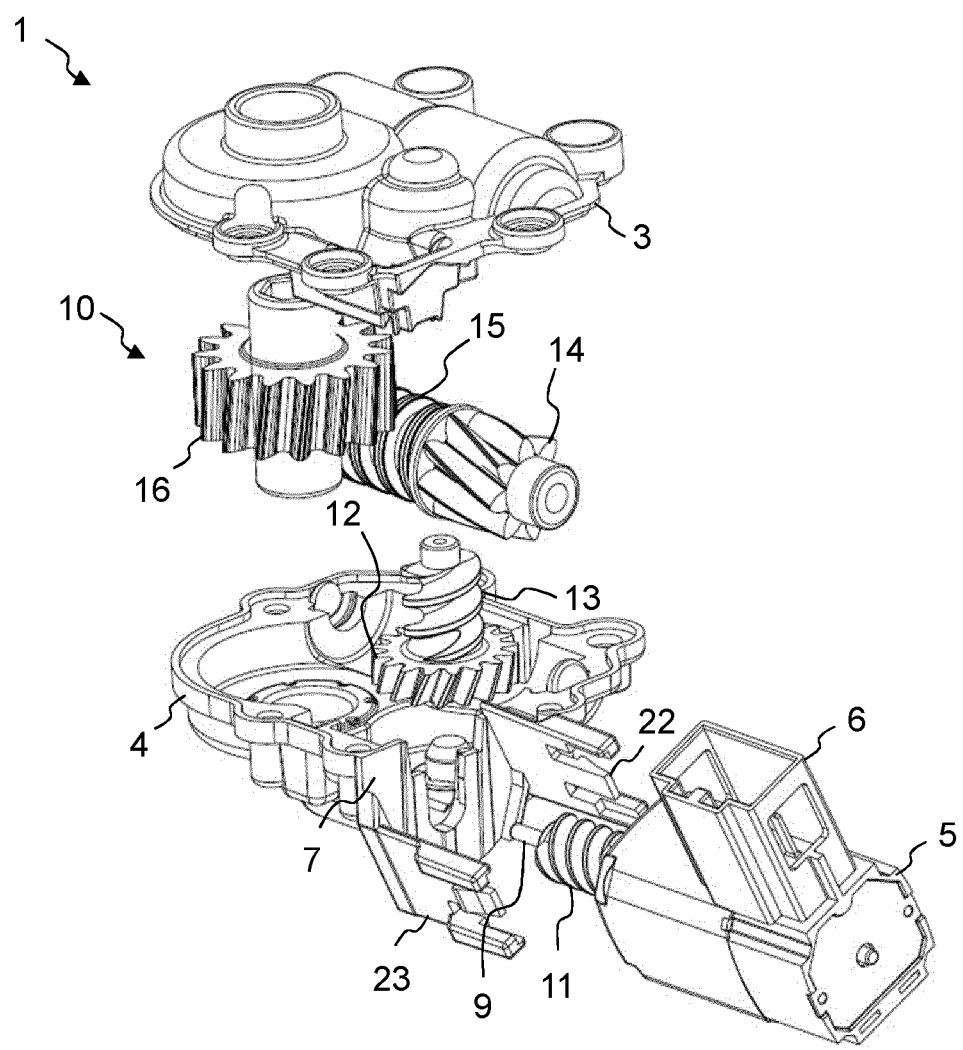
FIG. 10 shows a partial exploded perspective view of the seat component adjustment actuator of FIG. 9.

FIG. 9 shows a perspective view of the seat component adjustment actuator 1 according to an embodiment with a first housing shell 3 removed. FIG. 10 shows an exploded partial view of the seat component adjustment actuator 1 of FIG. 9.

The seat component adjustment actuator 1 comprises a housing 2, an electric motor 5, and a gearing 10 which may have any one of the configurations explained with reference to FIG. 1 to FIG. 8.

The seat component adjustment actuator 1 comprises a bracket 21 which retains the electric motor 5 in abutment on the housing 2. The bracket 21 may be configured to force an axial end face of a motor housing of the electric motor 5 in abutment with the external abutment surface 7 formed on the housing 2.

The bracket 21 may be configured to engage the housing 2 via a snap mechanism. The bracket 21 may be formed as plastic clip. The bracket 21 may comprise side walls 24, 25 configured to extend along lateral sides of the motor housing. The side walls 24, 25 may be configured to engage mating projections 21, 22 of the housing in a snap connection. The mating projections 21, 22 may define a recess therebetween in which the motor housing of the electric motor 5 is receivable.

Other components of the seat component adjustment actuator 1 of FIG. 9 and FIG. 10 may have any one of the configurations explained with reference to FIG. 1 to FIG. 8 above. In particular, the third worm gear 16 and the first worm gear 12 may be arranged so as to at least partially overlap. Alternatively or additionally, both the output rotation axis about which the third worm gear 16 is rotatable and the first rotation axis about which the first worm gear 12 and the second worm 13 are rotatable may be arranged in a space in between the first plane 51 which includes the input rotation axis and is parallel to the output rotation axis and the second plane 52 which includes the second rotation axis and is parallel to the output rotation axis, as explained with reference to FIG. 7 and FIG. 8.

Figure 11:
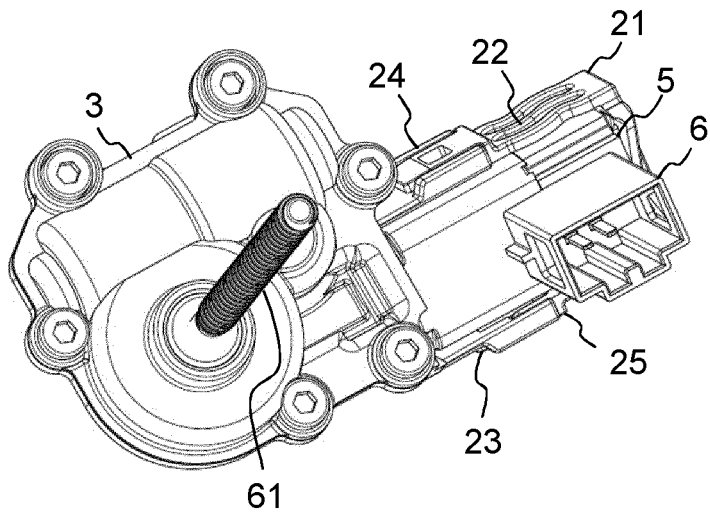
FIG. 11 shows a perspective view of a seat component adjustment actuator according to an embodiment.
Figure 12:
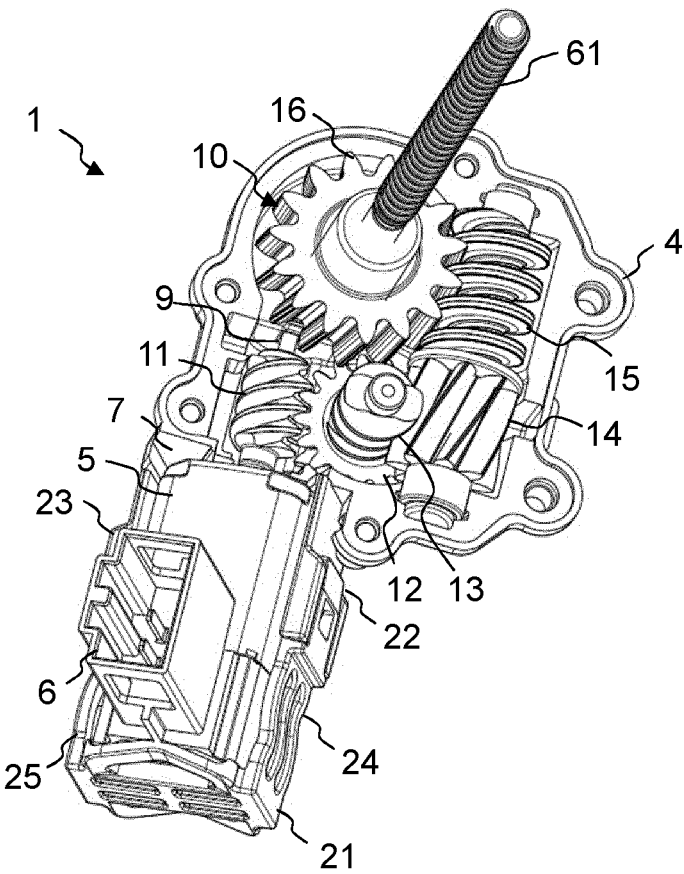
FIG. 12 shows a partial perspective view of the seat component adjustment actuator of FIG. 11.

FIG. 11 shows a perspective view of the seat component adjustment actuator 1 according to an embodiment. FIG. 12 shows a partial perspective view of the seat component adjustment actuator 1 of FIG. 11 in which a first housing shell 3 is removed.

The seat component adjustment actuator 1 comprises a housing 2, an electric motor 5, and a gearing 10 which may have any one of the configurations explained with reference to FIG. 1 to FIG. 8.

The seat component adjustment actuator 1 comprises a shaft 61. The shaft 61 is coupled to the third worm gear 16 in a torque-proof manner. The shaft 61 may be integrally formed with the third worm gear 16 or may be attached thereto. The shaft 61 may be molded to the third worm gear 16. The shaft 16 may extend from the housing 2 on at least one side. In some implementations, the shaft 16 may extend from the housing 2 on both opposing sides, respectively in a direction transverse to the output shaft 9 of the electric motor 5.

The shaft 61 may be provided with an external thread along at least a portion of its length. The external thread may be a helical thread. The seat component adjustment actuator 1 may comprise a spindle nut having an internal thread which is engaged with the external thread of the shaft 61.

The shaft 61 may alternatively or additionally be provided with a toothed section along at least a portion of its length. The toothed section may define one pinion, two pinions, or more than two pinions. The seat component adjustment actuator 1 may comprise at least one rack or other toothed element which is engaged with the toothed section of the shaft 61.

A seat component adjustment actuator 1 according to an embodiment may be installed in operative association with a seat component which is to be adjusted. The seat component adjustment actuator 1 may be installed in a cavity defined by the seat component which is to be adjusted. Two seat component adjustment actuators 1 or more than two seat component adjustment actuators 1 may be installed in the seat component to effect at least two different movements. The two or more seat component adjustment actuators 1 may be controllable so as to effect a coordinated adjustment along two or more different directions and/or so as to allow the two or more different adjustments to be executed independently.

The seat component according to an embodiment which houses a seat component adjustment actuator therein may be a headrest, a seat pan configured for seat cushion length adjustment, or another seat component.

Figure 13:
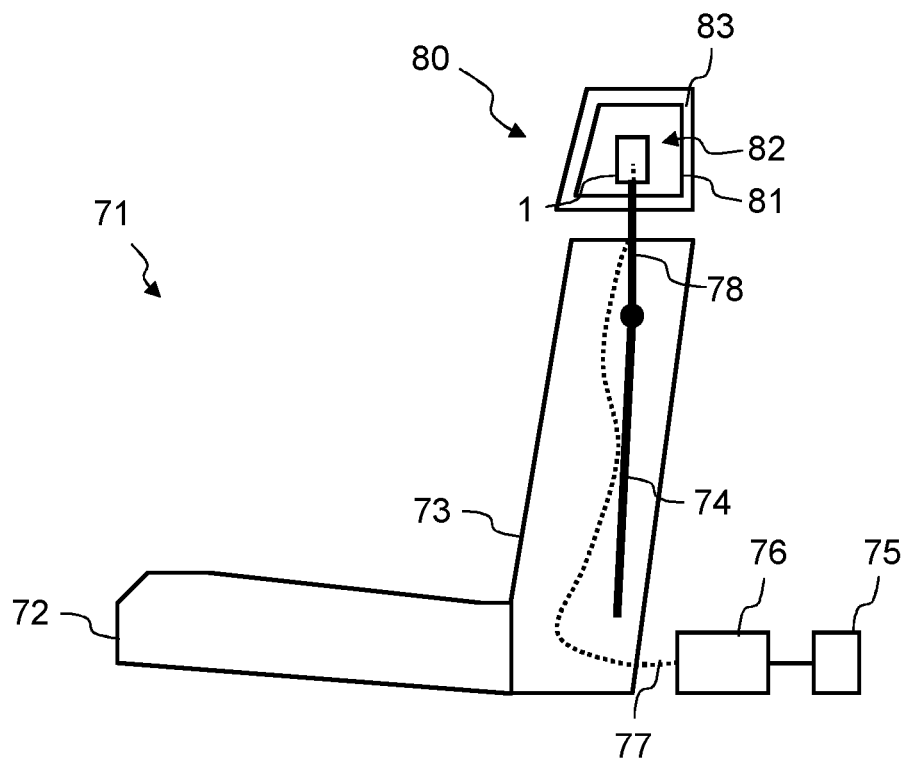
FIG. 13 is a schematic view of a seat comprising a seat component adjustment actuator according to an embodiment.

FIG. 13 shows a schematic view of a seat 71 according to an embodiment.

The seat 71 generally comprises a seat member 72, a backrest 73 and a headrest system. The headrest system may be mounted to the backrest 73. The headrest system may include a bracket having a longitudinal member 78, e.g. rods which have lower ends mounted to the backrest 73. The lower ends of the rods of the bracket may be attached to a frame 74 of the backrest 73.

The headrest system includes a headrest 80 so as to support an occupant's head. The headrest 80 comprises a shell 81 defining an internal cavity 82. Upholstery and a cover 83 may be provided on an exterior of the shell 81. Adjustment of the headrest 80 is performed using a seat component adjustment actuator 1 according to an embodiment, which comprises a three-stage worm transmission. The seat component adjustment actuator 1 is arranged in the cavity 82 which is formed in an interior of the headrest 80. The seat component adjustment actuator 1 is integrated into the headrest 80. When the seat component adjustment actuator 1 is actuated, e.g. by supplying electrical power thereto, the seat component adjustment actuator 1 displaces at least a portion of the headrest 80 relative to the longitudinal member 78 of the bracket. The longitudinal member 78 of the bracket may remain stationary relative to the frame 74 of the backrest 73. The longitudinal member 78 of the bracket may be arranged such that it is not displaced relative to the frame 74 of the backrest 73 when the seat component adjustment actuator 1 is activated.

The seat component adjustment actuator 1 may be configured to displace at least a portion of the headrest in a displacement direction which is transverse to the longitudinal member 78 of the bracket and/or in a direction along the longitudinal member 78. The seat component adjustment actuator 1 may be configured to displace at least a portion of the headrest 80 by pivoting it about an axis which is perpendicular to the longitudinal member 78 of the bracket.

The headrest 80 may have any configuration which provides the internal cavity 82 within the headrest 80, so that the headrest 80 can house the seat component adjustment actuator 1. For illustration, the headrest 80 may include the shell 81. The shell 81 may be formed from plastic. The fabric cover 83 may be provided around the shell 81. The fabric cover 83 may include a padding material for increased comfort. The shell 81 may be configured so as to define the external shape of the headrest 80 and to provide structural rigidity to the headrest 80. The shell 81 may be configured such that it defines the internal cavity 82 in which the seat component adjustment actuator 1 is housed.

A controller 76 may control operation of the seat component adjustment actuator 1. The controller 76 may be coupled to the seat component adjustment actuator 1 through an electrical connection 77. The controller 76 may control the voltage applied at the electrical connection 77 to thereby control activation of the seat component adjustment actuator 1. The electrical connection 77 may pass through an internal cavity in rods 78 of the bracket which mount the headrest system to the backrest 73. The control may be performed in different ways.

A user interface 75 may be provided which is coupled to the controller 76, so as to allow a user to effect an adjustment of the headrest 80 under the control of a user action. Alternatively or additionally, the controller 76 may automatically control the seat component adjustment actuator 1 when a certain driver is recognized, to thereby set the headrest 80 to a configuration (x-position or shape of front surface of the headrest and/or z-position or height of the headrest) which is suitable for the respective driver. An identification of a suitable headrest configuration may be automatically performed based on an identifier stored in a vehicle authorization element (vehicle key or corresponding key-like element) and a look-up table which stores heights for the headrest 80 for various identifiers. The controller 76 may automatically set the configuration of the headrest 80 by activating the seat component adjustment actuator 1, when required, when the identifier is read from the vehicle authorization element. The controller 76 may include a memory which stores a present position of the seat component adjustment actuator 1 of the headrest 80. Alternatively or additionally, the controller 76 may automatically control the seat component adjustment actuator 1 in response to a critical event, such as a collision.

Figure 14:
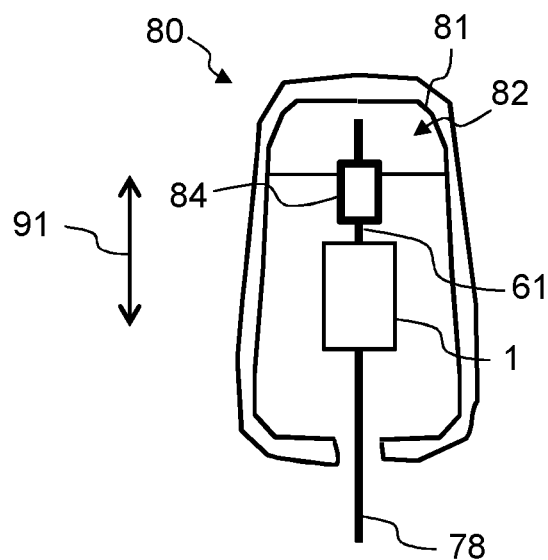
FIG. 14 is a schematic view of a headrest comprising a seat component adjustment actuator according to an embodiment.

FIG. 14 is detail view of a seat component implemented as a headrest 80. The seat component adjustment actuator 1 according to an embodiment is arranged within an interior cavity 82 of the headrest 80. The seat component adjustment actuator 1 may be configured to effect a movement 91 of the headrest 80 in a direction parallel to the longitudinal member 78 of the bracket, to thereby effect a z- or height adjustment.

The seat component adjustment actuator 1 may be mounted to the bracket so as to remain stationary when the headrest 80 is adjusted in the height direction. The seat component adjustment actuator 1 may comprise a shaft 61 projecting from the housing 2. The shaft 61 may have an external thread. A spindle nut 64 which is attached to the shell 81 may have an internal thread which is engaged with the external thread of the shaft 61. The spindle nut 64 is secured against rotation. Actuation of the seat component adjustment actuator 1 causes the spindle 61 to rotate. The spindle nut 64 engaged with the spindle 61 travels along the spindle 61, jointly with the shell 81. Height of the headrest 80 is thereby adjusted.

In another implementation, the spindle nut 64 may be mounted to the bracket 78 so as to remain stationary when the headrest 80 is adjusted in the height direction. The seat component adjustment actuator 1 may be attached to the shell 81 so as to move jointly with the shell 81. The shaft 61 projecting from the housing 2 may have an external thread engaged with the spindle nut 64. The spindle nut 64 is secured against rotation. Actuation of the seat component adjustment actuator 1 causes the spindle 61 to rotate. The seat component adjustment actuator 1 engaged with the spindle nut 64 travels relative to the spindle nut 64, jointly with the shell 81. Height of the headrest 80 is thereby adjusted.

Figure 15:
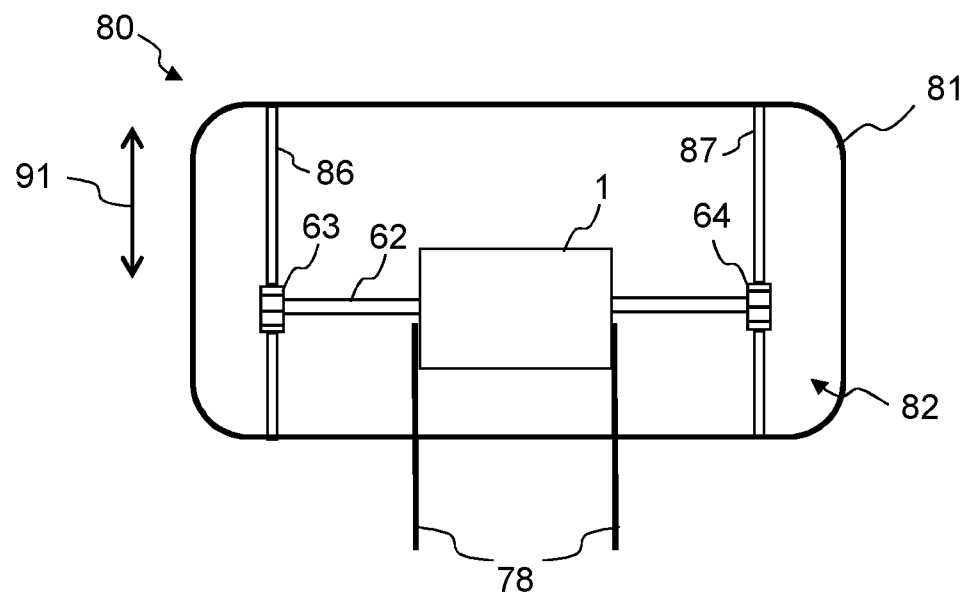
FIG. 15 is a schematic view of a headrest comprising a seat component adjustment actuator according to an embodiment.

FIG. 15 is detail view of a seat component implemented as a headrest 80. The seat component adjustment actuator 1 according to an embodiment is arranged within an interior cavity 82 of the headrest 80. The seat component adjustment actuator 1 may be configured to effect a movement 91 of the headrest 80 in a direction parallel to the longitudinal member 78 of the bracket, to thereby effect a z- or height adjustment.

The seat component adjustment actuator 1 may be mounted to the bracket so as to remain stationary when the headrest 80 is adjusted in the height direction. The seat component adjustment actuator 1 may comprise a shaft 61 projecting from the housing 2. The shaft 61 may have pinions 63, 64 which are provided at an outer surface of the shaft 61. Racks 86, 87 are attached to the shell 81 and have a toothing which is engaged with the pinions 63, 64. Actuation of the seat component adjustment actuator 1 causes the spindle 61 to rotate. The racks 86, 87 engaged with the pinions 63, 64 travel along the spindle 61, jointly with the shell 81. Height of the headrest 80 is thereby adjusted.

In another implementation, the racks 86, 87 may be mounted to the bracket 78 so as to remain stationary when the headrest 80 is adjusted in the height direction. The seat component adjustment actuator 1 may be attached to the shell 81 so as to move jointly with the shell 81. The shaft 61 projecting from the housing 2 may have pinions 63, 64. The spindle nut 64 is secured against rotation. Actuation of the seat component adjustment actuator 1 causes the spindle 61 to rotate. The seat component adjustment actuator 1 engaged with the racks 86, 87 via the pinions 63, 64 travels relative to the racks 86, 87, jointly with the shell 81. Height of the headrest 80 is thereby adjusted.

Additionally or alternatively to a seat component adjustment actuator 1 which displaces the headrest in a translatory manner along a height direction, the headrest may comprise a further seat component adjustment actuator 1 installed therein to pivot the headrest about a horizontal axis and/or to displace the headrest in a forward-rearward direction.

Figure 16:
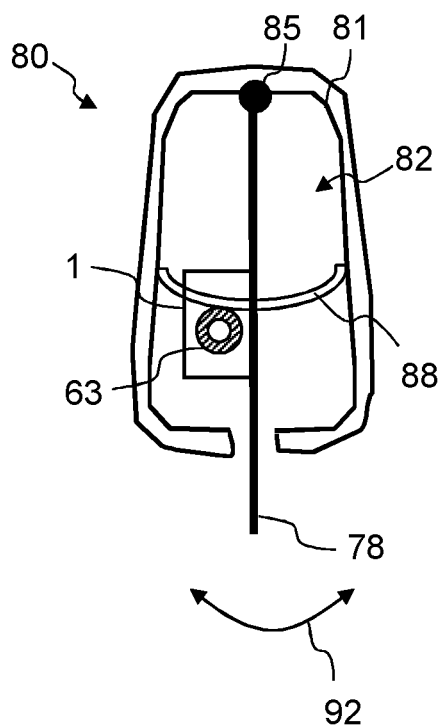
FIG. 16 is a schematic view of a headrest comprising a seat component adjustment actuator according to an embodiment.

FIG. 16 is detail view of a seat component implemented as a headrest 80. The seat component adjustment actuator 1 according to an embodiment is arranged within an interior cavity 82 of the headrest 80. The seat component adjustment actuator 1 may be configured to effect a pivoting movement 92 of the headrest 80 about a horizontal pivot axis 85.

The seat component adjustment actuator 1 may be mounted to the bracket so as to remain stationary when the headrest 80 is adjusted in the height direction. The seat component adjustment actuator 1 may comprise a shaft 61 projecting from the housing 2. The shaft 61 may have one or several pinions 63 which are provided at an outer surface of the shaft 61.

The headrest 80 may be mounted so as to be pivotable about the pivot axis 85. The headrest 80 may be pivotably suspended on the bracket which extends from the seat back. A curved rack 88 may be attached to the shell 81. The curved rack may have a toothing which is engaged with the pinion(s) 63. The toothing may be provided on an arc which extends about the pivot axis 85.

Actuation of the seat component adjustment actuator 1 causes the spindle 61 to rotate. The rack(s) 88 engaged with the pinion 63 is rotated about the pivot axis 85, jointly with the shell 81. An angular position of the headrest 80 is thereby adjusted relative to the pivot axis 85.

A seat component adjustment actuator 1 for effecting height adjustment, as described with reference to FIG. 14 and FIG. 15, may be combined with a further seat component adjustment actuator 1 for adjusting an angular position of the seat component, as described with reference to FIG. 16.

The self-locking provided by the three-stage worm transmission may lock the headrest 80 when the seat component adjustment actuator 1 is not actuated. Undesired adjustments effected by external forces are thereby mitigated.

The seat component adjustment actuator 1 may be used for adjusting additional or alternative seat components. For illustration, the seat component adjustment actuator 1 may be used for adjusting a length of a seat cushion or a footrest. The seat component adjustment actuator 1 may be mounted in a substructure of the seat cushion for this purpose, as illustrated in FIG. 17 and FIG. 18 for a seat cushion length adjustment and in FIG. 19 and FIG. 20 for a footrest adjustment.

Figure 17:
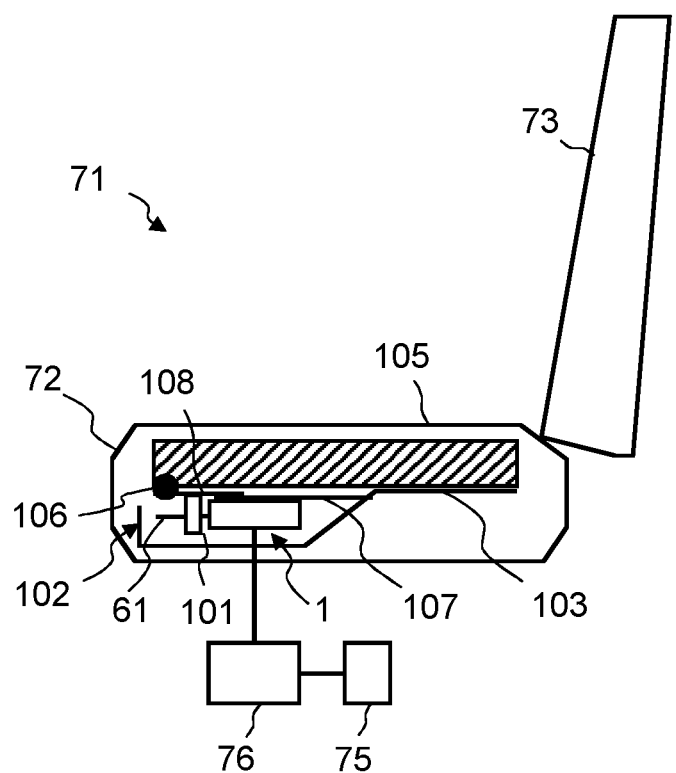
FIG. 17 is a schematic view of a seat comprising a seat component adjustment actuator according to an embodiment.
Figure 18:
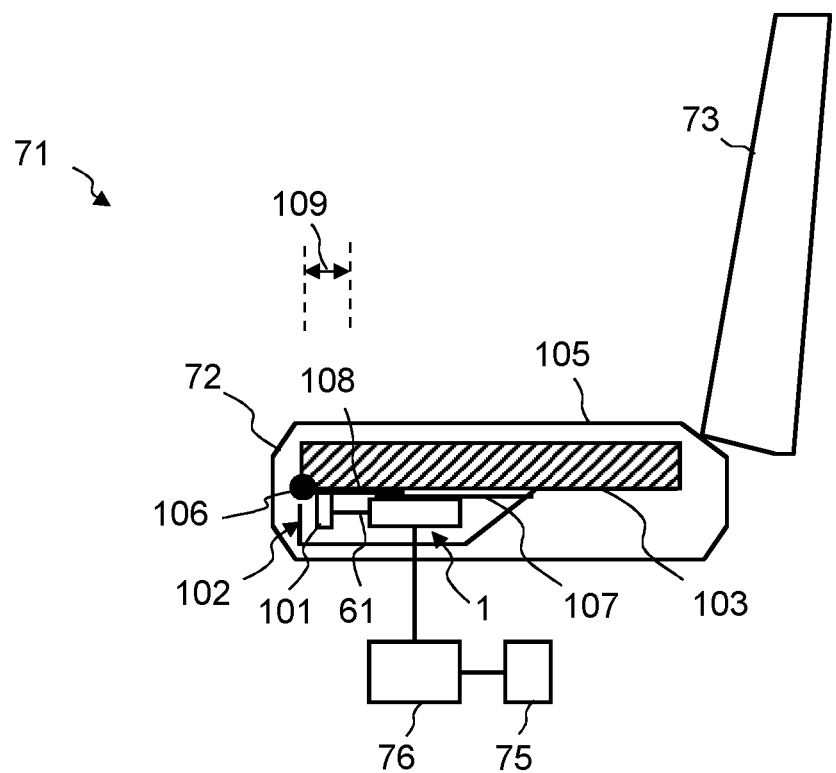
FIG. 18 is a schematic view of the seat of FIG. 17 after actuation of the seat component adjustment actuator.

FIG. 17 is a schematic view of a seat 71 according to an embodiment in which a seat component adjustment actuator 1 is provided for effecting a seat cushion length adjustment. FIG. 18 shows the seat 71 after the seat component adjustment actuator 1 effected a seat cushion length adjustment. The seat 71 may be a vehicle seat and may be configured as a car seat or another automotive vehicle seat.

The vehicle seat 71 generally comprises a seat 72 and a backrest 73. The seat 72 may comprise a structural member which provides structural stability to the seat 72. The structural member may be a seat pan and/or a seat frame. The seat 72 comprises a seat cushion. The seat cushion may comprise a cover 105. The cover 105 may be formed from a woven or non-woven fabric. The seat cushion may comprise a resilient backing 103, which provides enhanced comfort. The resilient backing 103 may be upholstery. The resilient backing 103 may be made of or may comprise a foam material or a fiber material, for example. The cover 105 is reversibly deformable when a seat cushion length adjusting device extends or reduces a length of the seat cushion. The resilient backing 103 may be resiliently deformed and/or at least a portion of the resilient backing 103 may be displaced relative to the cover 105 when the seat cushion length is adjusted.

The vehicle seat 71 includes the seat cushion length adjusting device which is coupled to the seat cushion to adjust a length of the seat cushion and which comprises the seat component adjustment actuator 1 according to an embodiment. The seat cushion length adjusting device is installed in a cavity defined within the seat 72 and is operative to modify an exterior shape of the vehicle seat 71 by reversibly changing a length of the seat cushion. The length of the seat cushion upon which the thighs of the seat occupant may rest can thereby.

The adjustment of the seat cushion length may be implemented in various ways using the seat cushion length adjusting device. For illustration, the cover 105 and the resilient backing 103 may be deformed elastically under the action of the seat cushion length adjusting device. Alternatively or additionally, the resilient backing 103 may be displaced within the seat under the action of the seat cushion length adjusting device. Alternatively or additionally, the resilient backing 103 may have at least two portions which are displaceable relative to one another, and the seat cushion length adjusting device 103 may be configured to displace one of the portions of the resilient backing 103 relative to another one of the portions of the resilient backing 103. The seat cushion length adjusting device may be configured to adjust a distance between two opposing peripheral edges of the seat cushion.

The seat cushion length adjusting device generally includes a support 102 and an adjusting member 108 which is displaceably relative to the support 102. The adjusting member 108 may be mounted on the support 102 so as to be displaceable in a translatory manner relative to the support 102. The support 102 may be a section of the seat pan, may be integrally formed with the seat pan or may be affixed to the seat pan such as by bolts, screws or other attachment techniques.

The seat cushion length adjusting device includes the electric motor 5 and a gearing 10 which comprises a three-stage worm transmission. The housing 2 may be affixed to the support 102 or which may be integrally formed with the support 102. The speed reduction gearing may have an input coupled to the motor shaft and may have an output. The gearing 10 may be a speed reduction gearing to provide a speed reduction, e.g. a reduction of angular velocity of the output compare to angular velocity of the input, and a torque increase.

The seat cushion length adjusting device includes a rotary to linear motion conversion mechanism. The rotary to linear motion conversion mechanism is operative to convert a rotational motion of the output shaft of the speed reduction gearing into a translatory displacement of the adjusting member 108. The motion conversion mechanism may have any one of various configurations. The motion conversion mechanism may comprise a spindle drive having a spindle and a spindle nut in threading engagement with the spindle. The motion conversion mechanism may comprise a rack and pinion drive.

The adjusting member 108 is coupled to the seat cushion. Any one of various coupling mechanisms may be used. A front portion of the adjusting member 108 may be received in a pocket defined by the seat cushion to implement a coupling structure 106 which couples the adjusting member 108 to the front end of the seat cushion. Alternatively or additionally, the adjusting member 108 may be attached to the front portion of the seat cushion by means of one or several attachment techniques which form the coupling structure 106, e.g. by bolts, screws, rivets, adhesive, welding, or other techniques.

Activation of the electric motor of the seat component adjustment actuator 1 causes the adjusting member 108 to be displaced relative to the support 102. The adjusting member 108 is displaced relative to a rear end of the seat 72 and/or relative to the backrest 73. For a vehicle seat 71 installed in a vehicle, the adjusting member 108 is displaced relative to the seat pan, while activation of the electric motor of the seat cushion length adjusting device does not cause any displacement of the seat pan relative to the vehicle floor, for example.

By activating the electric motor of the seat cushion length adjusting device, the length of the seat cushion may be altered by an increment or decrement 109, depending on the rotation direction of the motor shaft. By controlling the electric motor such that the motor shaft rotates in a first direction, the length of the seat cushion may be increased by an increment 109, as illustrated in FIG. 18. By operating the electric motor such that the motor shaft rotates in a second direction opposite to the first direction, the length of the seat cushion may be decreased. The shape of the seat 72 and, in particular, the length of the seat cushion may thereby be adjusted to accommodate various passenger sizes and various thigh lengths or sitting positions.

As illustrated in FIG. 18, activation of the electric motor of the seat cushion length adjusting device may displace a front end of the seat cushion in a forward direction by a distance 109. The length of the seat cushion and the external shape of the seat 72 may thereby be changed. When the electric motor is activated such that an output shaft of the electric motor rotates in the reverse direction, the front end of the seat cushion may be displaced in a rearward direction under the action of the seat cushion length adjusting device.

A controller 76 may control operation of the seat component adjustment actuator 1. The controller 76 may be coupled to the seat component adjustment actuator 1 through an electrical connection. The controller 76 may control the voltage applied at the electrical connection to thereby control activation of the seat component adjustment actuator 1. The controller 76 may control a polarity of the voltage supplied to the electric motor. The control may be performed in different ways. A user interface 75 may be provided which is coupled to the controller 76, so as to allow a user to effect an adjustment of the seat cushion length under the control of a user action. Alternatively or additionally, the controller 76 may automatically control the seat component adjustment actuator 1 when a certain driver is recognized to thereby set the seat cushion length to a value which is suitable for the respective driver. An identification of a suitable seat cushion length may be automatically performed based on an identifier stored in a vehicle authorization element (vehicle key or corresponding key-like element) and a look-up table which stores seat cushion lengths for various identifiers. The controller 76 may automatically set the configuration of the seat cushion length by activating the seat component adjustment actuator 1, when required, when the identifier is read from the vehicle authorization element. The controller 76 may include a memory which stores a present position of the seat component adjustment actuator 1 of the seat cushion length adjusting device. Alternatively or additionally, the controller 76 may automatically control the seat component adjustment actuator 1 in response to a critical event, such as a collision.

Figure 19:
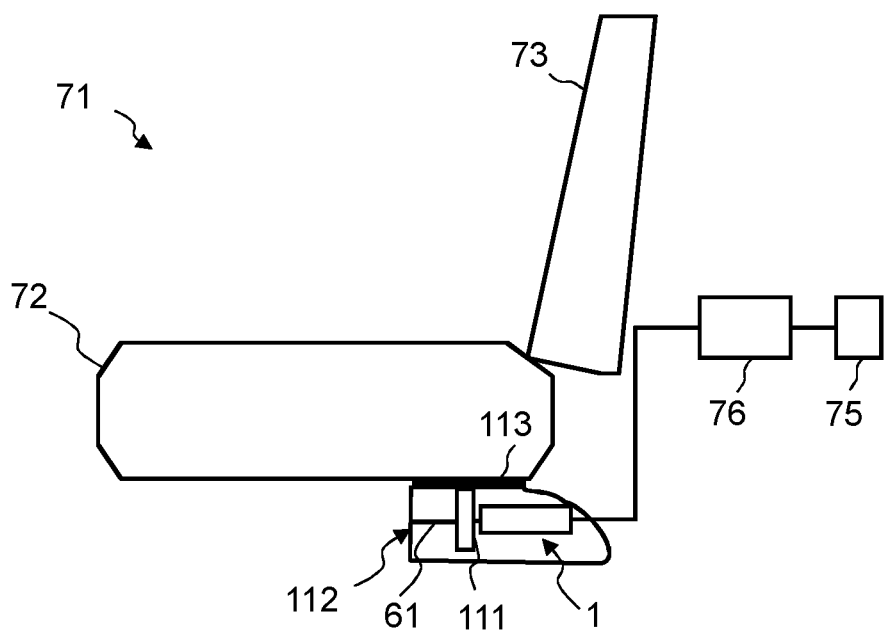
FIG. 19 is a schematic view of a seat comprising a seat component adjustment actuator according to an embodiment.
Figure 20:
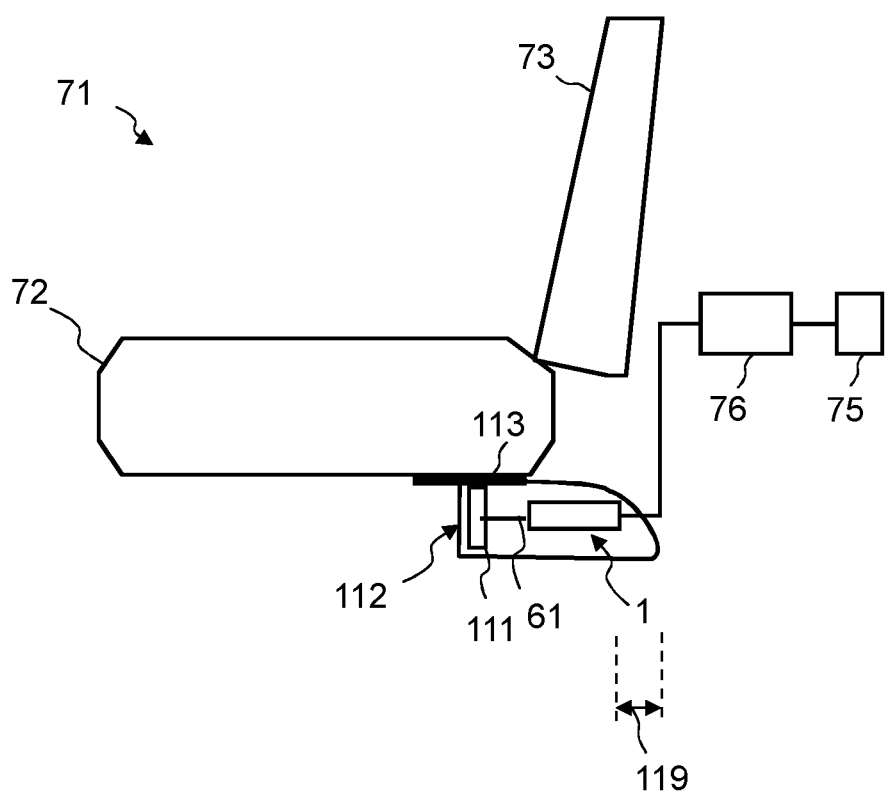
FIG. 20 is a schematic view of the seat of FIG. 19 after actuation of the seat component adjustment actuator.

FIG. 19 is a schematic view of a seat 71 according to an embodiment in which a seat component adjustment actuator 1 is provided for effecting a footrest adjustment. FIG. 20 shows the seat 71 after the seat component adjustment actuator 1 effected a seat cushion length adjustment. The seat 71 may be a vehicle seat and may be configured as a car seat or another automotive vehicle seat.

The vehicle seat 71 comprises a seat 72 and a backrest 73. A footrest 112 may be displaceably supported at lower side of the vehicle seat 71. The footrest may be positioned towards a read of the vehicle seat 71 to provide adjustable foot support for an occupant seated behind the vehicle seat 71, e.g. on a second row seat.

The footrest 112 may define a cavity in which a seat component adjustment actuator 1 according to an embodiment is mounted. The seat component adjustment actuator 1 may comprise a spindle 61 which is coupled to the third worm gear of the gearing and which is engaged with a spindle nut 111. Alternatively, the seat component adjustment actuator may comprise a pinion provided on the output shaft, the pinion being engaged with a rack. The spindle nut 111 or rack may be attached to a structural member 113 of the vehicle seat 71, which may be a frame, a rail or another structural member of the vehicle seat 71.

By activating the electric motor of the seat component adjustment actuator 1, the position of the footrest 112 may be changed by an increment or decrement 109, depending on the rotation direction of the motor shaft. By controlling the electric motor such that the motor shaft rotates in a first direction, the footrest 112 may be displaced rearward, as illustrated in FIG. 20, to thereby extend the footrest. By operating the electric motor such that the motor shaft rotates in a second direction opposite to the first direction, the footrest 112 may be displaced forwardly, to thereby retract the footrest into a stowage position.

A controller 76 may control operation of the seat component adjustment actuator 1 in any one of the ways explained with reference to FIG. 17 and FIG. 18, for example.

While embodiments have been described with reference to the drawings, alternative or additional features may be implemented in other embodiments. For illustration, while the third worm gear comprised by the third worm transmission stage may form an output of the gearing 10, additional gearing stages may be added in between the third worm gear and the output of the gearing 10. While the first worm 11 comprised by the first worm transmission stage may form an input of the gearing 10, additional gearing stages may be added in between the output shaft of the electric motor and the input of the gearing 10.

In all embodiments, the spindle coupled to the third worm gear may be a flexible shaft or flex-shaft which is provided with an external thread or with an external toothing. The flexible shaft may have a metal core comprising one metal wire or a plurality of metal wires. The flexible shaft may have an external thread. The flexible shaft may have a metal wire helix on its outer surface for forming the external thread. The spindle and, if present, the second spindle may also be rigid.

According to embodiments, an adjustment of a headrest, a seat cushion, a footrest or of other seat components may be realized using a seat component adjustment actuator which is housed within the seat component. The seat component adjustment actuator may have a speed reduction gearing which is implemented as a three-stage worm transmission. The rotational movement of the third worm wheel comprised by the third worm transmission stage is converted into a linear movement using a spindle transmission, a rack and pinion mechanism or another rotary to linear motion conversion mechanism.

Several seat component adjustment actuators according to embodiments may be provided on the same or on several different seat components. For illustration, seat component adjustment actuators according to embodiments may be mounted in a headrest and/or in a footrest and/or in a seat pan, to attain various comfort adjustments.

In each one of the various embodiments, the linear movement provided by the rotary to linear motion conversion mechanism can be converted into the adjustment movement of the seat component with various solutions, like knee joint or lever transmission, without being limited thereto. The seat component adjustment actuator may be mounted on various locations of the seat. For illustration, the seat component adjustment actuator may be mounted so as to be moveable on a lever system, may be fixed at the seat component shell with clips, rivets or other known mounts, or may be fixed to a stationary bracket.

It will be appreciated that various technical effects can be attained using the seat component adjustment actuator, seat component, and vehicle seat according to embodiments. The seat component adjustment actuator has a compact construction, which allows it to be integrated into the internal cavity of the seat component. The three-stage worm transmission allows compact electric motors to be used. A low weight and inexpensive construction may be realized. In particular, the three-stage worm transmission may be arranged in a compact housing.

While exemplary embodiments have been described in the context of headrest and seat length adjustment of a vehicle seat, embodiments of the invention are not limited to this particular field of application. Rather, embodiments of the invention may be advantageously employed to adjust seat components in a wide variety of seats.

What is claimed is:

1. A seat component adjustment actuator comprising:
   a housing;
   an electric motor; and
   a gearing coupled to the electric motor and including at least three worm transmission stages, wherein
      a first worm transmission stage of the at least three worm transmission stages includes a first worm and a first worm gear engaged with the first worm, and
      a third worm transmission stage of the at least three worm transmission stages includes a third worm and a third worm gear engaged with the third worm,
   wherein the first worm is supported in the housing such that the first worm is rotatable about an input rotation axis and wherein the third worm gear is supported in the housing such that the third worm gear is rotatable about an output rotation axis which is transverse to the input rotation axis,
   wherein the first worm gear is rotatable about a first rotation axis which is parallel to the output rotation axis,
   wherein the third worm gear is offset relative to the first worm gear in a direction parallel to the output rotation axis,
   wherein a distance between the output rotation axis and the first rotation axis is less than the sum of the radius of the third worm gear and the radius of the first worm gear such that the third worm gear at least partially overlaps the first worm gear, and
   wherein a second worm transmission stage of the at least three worm transmission stages includes a second worm connected to the first worm gear and a second worm gear engaged with the second worm and connected to the third worm.

2. The seat component adjustment actuator according to claim 1, wherein the second worm gear is rotatable about a second rotation axis parallel to the input rotation axis, and wherein the output rotation axis extends in between
   a first plane which includes the input rotation axis and extends parallel to the output rotation axis, and
   a second plane which includes the second rotation axis and extends parallel to the output rotation axis.

3. The seat component adjustment actuator according to claim 1, wherein a shaft coupled to the third worm gear projects from the housing.

4. The seat component adjustment actuator according to claim 3, wherein at least one of a thread or a toothed section is provided on at least a portion of the shaft.

5. The seat component adjustment actuator according to claim 1, wherein the housing comprises an exterior abutment surface on which an axial end face of a motor housing of the electric motor abuts.

6. The seat component adjustment actuator according to claim 5, further including a bracket to retain the axial end face in abutment with the abutment surface.

7. The seat component adjustment actuator according to claim 6, wherein the housing comprises an attachment feature configured for detachable attachment of the bracket.

8. A seat comprising:
   a seat component having a shell which is displaceably mounted and defines a cavity, and
   the seat component adjustment actuator according to claim 1 which is mounted in the cavity and configured to effect a displacement of the shell relative to the seat.

9. The seat according to claim 8, further including
   a further seat component adjustment actuator according to claim 1,
   wherein the seat component adjustment actuator and the further seat component adjustment actuator are configured to displace the seat component in at least two directions which are transverse to each other.

10. The seat according to claim 8, wherein the seat component is a headrest.

11. A method of adjusting a seat component, the method comprising use of the seat component adjustment actuator according to claim 1 for adjusting the seat component.

12. A seat component adjustment actuator comprising:
    a housing;
    an electric motor; and
    a gearing coupled to the electric motor and comprising at least three worm transmission stages, wherein
       a first worm transmission stage of the at least three worm transmission stages comprises a first worm and a first worm gear engaged with the first worm, and
       a third worm transmission stage of the at least three worm transmission stages comprises a third worm and a third worm gear engaged with the third worm,
    wherein the first worm is supported in the housing such that the first worm is rotatable about an input rotation axis and wherein the third worm gear is supported in the housing such that the third worm gear is rotatable about an output rotation axis which is transverse to the input rotation axis,
    wherein the first worm gear is rotatable about a first rotation axis which is parallel to the output rotation axis,
    wherein a second worm transmission stage of the at least three worm transmission stages comprises a second worm connected to the first worm gear and a second worm gear engaged with the second worm and connected to the third worm, the second worm gear being rotatable about a second rotation axis which is parallel to the input rotation axis, and
    wherein the output rotation axis extends in between a first plane which includes the input rotation axis and extends parallel to the output rotation axis and a second plane which includes the second rotation axis and extends parallel to the output rotation axis.

* * * * *